United States Patent
Premerlani et al.

(10) Patent No.: US 9,847,647 B2
(45) Date of Patent: Dec. 19, 2017

(54) SOLAR POWER CONVERSION SYSTEM AND METHOD

(71) Applicant: GENERAL ELECTRIC COMPANY, Schenectady, NY (US)

(72) Inventors: William James Premerlani, Scotia, NY (US); Patrick Hammel Hart, Ballston Lake, NY (US); Maozhong Gong, Watervliet, NY (US)

(73) Assignee: General Electric Company, Niskayuna, NY (US)

( * ) Notice: Subject to any disclaimer, the term of this patent is extended or adjusted under 35 U.S.C. 154(b) by 215 days.

(21) Appl. No.: 14/877,345

(22) Filed: Oct. 7, 2015

(65) Prior Publication Data

US 2017/0104334 A1     Apr. 13, 2017

(51) Int. Cl.
*H02J 3/00*     (2006.01)
*H02J 3/38*     (2006.01)
(Continued)

(52) U.S. Cl.
CPC ............... *H02J 3/383* (2013.01); *H02M 3/04* (2013.01); *H02M 7/44* (2013.01)

(58) Field of Classification Search
CPC .. H02J 3/50; H02J 3/383; H02J 3/385; H02M 7/44; H02M 7/445; H02M 7/46;
(Continued)

(56) References Cited

U.S. PATENT DOCUMENTS

| | | |
|---|---|---|
| 4,916,377 A | 4/1990 | Terada et al. |
| 5,136,233 A | 8/1992 | Klinkenberg et al. |

(Continued)

FOREIGN PATENT DOCUMENTS

| | | |
|---|---|---|
| EP | 1841037 A2 | 10/2007 |
| EP | 2236820 A2 | 10/2010 |

(Continued)

OTHER PUBLICATIONS

Dong et al., "Improving voltage stability by reactive power reserve management", Power Systems, IEEE Transactions on, vol. 20, Issue 1, pp. 338-345, Feb. 2005.

(Continued)

*Primary Examiner* — Lincoln Donovan
*Assistant Examiner* — Patrick Chen
(74) *Attorney, Agent, or Firm* — Nitin N. Joshi

(57) ABSTRACT

A solar power conversion system includes a photovoltaic array having photovoltaic modules for generating direct current (DC) power. A power converter is provided in the system for converting the DC power to alternating current (AC) power. A transformer is coupled between the power converter and a power grid for transmitting the AC power to the power grid. The transformer is connected to the power grid at the point of common coupling (PCC) and to the power converter at output terminals. A reactance estimation module is provided in the system for estimating a short circuit reactance at PCC based on a small change in a measured voltage at output terminals with respect to a small change in a measured reactive power at the output terminals. Further, a maximum reactive power estimation module estimates a maximum reactive power based on the estimated reactance, the measured voltage at output terminals, and the measured reactive power at the output terminals. A controller in the system generates switching command signals for the power converter based on the measured voltage at output terminals and the estimated maximum reactive power.

20 Claims, 2 Drawing Sheets

(51) Int. Cl.
*H02M 3/04* (2006.01)
*H02M 7/44* (2006.01)

(58) Field of Classification Search
CPC .......... H02M 7/48–7/487; H02M 7/49; H02M 7/493; H02M 7/497; H02M 7/501; H02M 3/04; H02M 3/06; H02M 3/07; H02M 3/073; H02M 2003/071–2003/078
USPC .......................................................... 307/82
See application file for complete search history.

(56) References Cited

U.S. PATENT DOCUMENTS

| | | | |
|---|---|---|---|
| 5,402,057 A | 3/1995 | D Aquila et al. | |
| 6,396,248 B1 | 5/2002 | Sen et al. | |
| 6,492,801 B1 | 12/2002 | Sims et al. | |
| 6,707,283 B1 | 3/2004 | Ball | |
| 6,841,976 B1 | 1/2005 | Sen et al. | |
| 7,508,173 B2* | 3/2009 | Zhou | H02J 3/1835 323/205 |
| 8,295,063 B2* | 10/2012 | Gong | H02M 1/12 363/40 |
| 8,772,965 B2 | 7/2014 | El-Barbari et al. | |
| 8,774,974 B2 | 7/2014 | Chee et al. | |
| 8,816,531 B2 | 8/2014 | Krok et al. | |
| 9,450,513 B2* | 9/2016 | Ohori | H02M 7/44 |
| 2010/0138061 A1 | 6/2010 | Walling et al. | |
| 2010/0220499 A1 | 9/2010 | Haj-Maharsi et al. | |
| 2012/0235498 A1 | 9/2012 | Johnson et al. | |
| 2013/0066480 A1* | 3/2013 | Glavic | H02J 3/14 700/295 |
| 2013/0076134 A1 | 3/2013 | Smith et al. | |
| 2013/0077367 A1 | 3/2013 | Zhu et al. | |
| 2013/0148394 A1* | 6/2013 | O'Brien | H02J 3/383 363/95 |
| 2013/0250635 A1 | 9/2013 | Sivakumar et al. | |
| 2013/0274946 A1 | 10/2013 | Schelenz et al. | |
| 2014/0100705 A1 | 4/2014 | Shi et al. | |
| 2014/0103888 A1 | 4/2014 | Divan et al. | |
| 2014/0307494 A1* | 10/2014 | Wu | H02M 7/48 363/97 |
| 2015/0069978 A1 | 3/2015 | Watanabe et al. | |

FOREIGN PATENT DOCUMENTS

| | | |
|---|---|---|
| EP | 2395651 A2 | 12/2011 |
| EP | 2521237 B1 | 4/2014 |

OTHER PUBLICATIONS

A. Walling, "Grid Support Functions Implemented in Utility-Scale PV Systems," Published in Transmission and Distribution Conference and Exposition, 2010 IEEE PES, New Orleans, LA, Apr. 19-22, 2010, pp. 1-5.

Shirek, "Solar PV Modeling and Impacts on Distribution Systems", Milsoft Utility Solutions, Milsoft Users Conference, 40 pages, 2012.

PCT Search Report and Written Opinion issued in connection with corresponding PCT Application No. PCT/US2016/046238 dated Oct. 21, 2016.

PCT Search Report and Written Opinion issued in connection with related PCT Application No. PCT/US2016/048811 dated Oct. 27, 2016.

\* cited by examiner

SOLAR POWER CONVERSION SYSTEM AND METHOD

BACKGROUND

The invention relates generally to solar power conversion systems and, more particularly, to a system and method for controlling solar power conversion systems.

With the rising cost and scarcity of conventional energy sources and concerns about the environment, there is a significant interest in alternative energy sources such as solar power and wind power. Power converters are used to convert solar and wind energy to usable power that is transmitted over a power grid or directly to a load.

For utility scale solar power conversion systems, there are many challenges in connecting solar power converters to the power grid. Electricity applied to the electrical grid is required to meet grid connectivity expectations. These requirements address safety issues as well as power quality concerns. A central controller may be used to control the general operations of the power converters in the solar power conversion system as well as to coordinate combined power from the power converters by generating complex commands regarding curtailment and power output for example. The central controller typically monitors grid signals at the point of interconnection to the grid and generates various commands that are sent to local controllers embedded within individual power converters. In such embodiments, many system parameters are needed to be known. However, sometimes it is not possible to measure certain system parameters.

Hence, there is a need for an improved system to address the aforementioned issues.

BRIEF DESCRIPTION

In accordance with an embodiment of the present technique, a solar power conversion system including a photovoltaic array having photovoltaic modules for generating direct current (DC) power is provided. The system also includes a power converter for converting the DC power to alternating current (AC) power and a transformer coupled between the power converter and a power grid for transmitting the AC power to the power grid. The transformer is connected to the power grid at the point of common coupling (PCC) and to the power converter at output terminals. The system further includes a reactance estimation module configured to estimate a short circuit reactance at PCC based on a small change in a measured voltage at output terminals with respect to a small change in a measured reactive power at the output terminals. Further, the system includes a maximum reactive power estimation module to estimate a maximum reactive power based on the estimated reactance, the measured voltage at output terminals, and the measured reactive power at the output terminals and a controller for generating switching command signals for the power converter based on the measured voltage at output terminals and the estimated maximum reactive power.

In accordance with another embodiment of the present technique, method to transmit solar power to a power grid is provided. The method includes providing a photovoltaic array having photovoltaic modules for generating direct current (DC) power and providing a power converter for converting the DC power to alternating current (AC) power. The method also includes coupling a transformer between the power converter and the power grid for transmitting the AC power to the power grid, wherein the transformer is connected to the power grid at the point of common coupling (PCC) and to the power converter at output terminals. The method further includes estimating a short circuit reactance at PCC based on a small change in a measured voltage at output terminals with respect to a small change in a measured reactive power at the output terminals. Further, the method includes estimating a maximum reactive power based on the estimated reactance, the measured voltage at output terminals, and the measured reactive power at the output terminals and generating switching command signals for the power converter based on the measured voltage at output terminals and the estimated maximum reactive power.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function.

Figure 1:
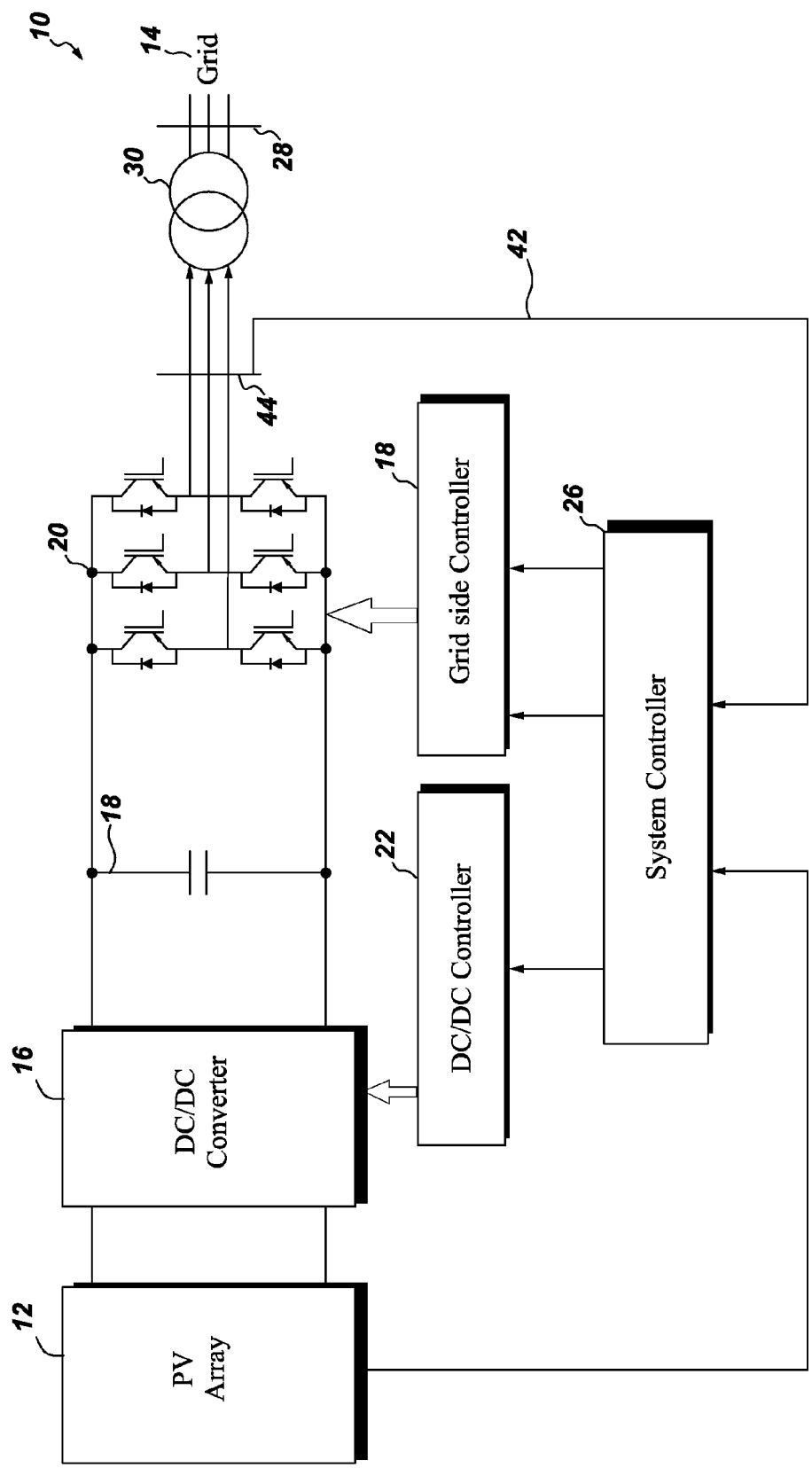
FIG. 1 is a schematic representation of a solar power generation system.

FIG. 1 illustrates a solar power generation system 10. The power generation system includes a photovoltaic (PV) array 12 including a plurality of connected PV modules (not shown). The PV array is connected to a power grid 14 through a DC/DC converter 16, a DC link 18, and a grid side three-phase DC/AC converter 20. In other embodiments, the grid side three-phase converter may be replaced by multiple single-phase converters. In one embodiment, the DC/DC converter 16 maintains a constant DC voltage at the DC link 18, and thus the energy flow from the PV module 12 to the power grid 14 is managed. The DC/DC converter 16 is controlled by a DC/DC controller 22, and the grid side converter 20 is controlled by a grid side controller 18. A system controller 26 generates a reference DC voltage command, a reference output voltage magnitude command, and a reference frequency command for the DC/DC converter 16 and the grid side converter 20 respectively. In other systems, a single controller may be used for the multiple control functions shown in FIG. 1. Filters (not shown) may be used in the system for removing harmonics from the system output power, and transformer 30 is used for matching grid side converter output voltage to the grid voltage at the point of common coupling (PCC) 28. Power grid 14 may comprise a utility grid or any other system of connecting power generation systems and loads.

Generally, real power output generated by PV module fluctuates throughout the day based on sunlight at any given time. This fluctuation in real power output results in fluctuation of current and so the voltage drop in resistance (Ra) and reactance (Xa) of the transformer 30. The change in voltage (ΔVa) at PCC 28 because of the change in real power (ΔPa) may be given as:

$$\Delta Va = (\Delta P \cdot Ra - \Delta Q \cdot Xa)/V \qquad (1)$$

In the equation above, ΔQa is change in reactive power. The voltage fluctuation (ΔVa) may have adverse impacts on grid voltage. The grid operators then may need to employ capacitor banks or voltage tap changes to suppress this adverse impact of voltage fluctuation. Therefore, in some cases, the grid operators may require solar power system operators to minimize the voltage fluctuation. In the equation above, if the goal is to make ΔVa zero, then the reactive power Qa needs to be varied in synchronism with variation in real power Pa. In other words, the change in reactive power to compensate for change in real power to avoid the voltage fluctuation may be given as:

$$\Delta Qa = \Delta Pa \cdot Ra/Xa \qquad (2)$$

The above changes in reactive power are generally supplied by grid side DC/AC converter 20. The grid side DC/AC converter functionally operates as a static synchronous compensator (STATCOM) to supply the required reactive power. In one embodiment, a closed loop system as shown in FIG. 1 is employed to measure the changes in voltage at PCC 28 and to accordingly regulate the reactive power generated by the grid side DC/AC converter 20. However, the amount of reactive power that a grid side DC/AC converter 20 can supply may be limited because of the maximum voltage rating of the converter. Further, the maximum reactive power the converter can supply at any given time varies depending on grid voltage.

According to one embodiment of the present technique, reactive power limits for grid side DC/AC converter 20 are determined in real time and are used in grid side controller 18 to for effective control of DC/AC converter 20.

Figure 2:
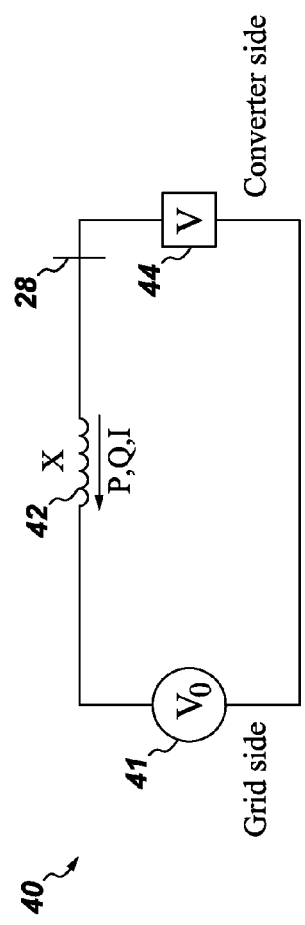
FIG. 2 is a schematic representation of an equivalent circuit representing the grid and the grid side DC/AC converter connection in accordance with an embodiment of the invention.

FIG. 2 is a schematic representation of an equivalent circuit 40 representing the grid and the grid side DC/AC converter connection in accordance with an embodiment of the present technique. The equivalent circuit 40 is an approximate model of the overall system 10 and is represented by an open circuit voltage source 41 having voltage $V_0$ representing grid voltage as seen from output terminals 44 during an open circuit condition (i.e., when the power converter 20 is not connected to grid) and a reactance 42 having reactance value X representing short circuit reactance at the output terminals 44. The DC/AC converter side is represented by voltage source 44 having voltage V as seen at output terminals 44. The objective here is to control the voltage V such that the fluctuations in V due to real power P variations generated by the PV array are minimized. The reactance X reflects the net effect of all reactances involved, including transformers and transmission lines, for example. It can be shown that the voltage V can be represented in terms of the open circuit voltage $V_0$, the equivalent reactance X, and active power P and reactive power Q, where P and Q are taken as positive for flow from the DC/AC converter into the grid. In one embodiment, voltage V is measured, thus, using the same relationship open circuit voltage $V_0$ can be determined.

In terms of complex number, the voltage V may be given as:

$$V = V_0 + IjX \qquad (3)$$

where I is the current flowing from DC/AC converter into the grid. From the above equation complex conjugate of I may be determined in terms of complex conjugate of V as below:

$$I^* = -(V^* - V0)/jX \qquad (4)$$

In the above equation, voltage $V_0$ is considered reference voltage and thus, its phase angle is considered to be zero and magnitude equal to $V_0$. Furthermore, in the equation above, the voltage drop across the resistance (R) is ignored and as the voltage drop is generally dominated by reactance X. Further, as the above equation is in terms of complex signals, the current I needs to be measured in terms of phasor quantity i.e., a phase angle as well as a magnitude of current I needs to be measured which can be measured only by a phasor measurement unit. Therefore, the control of grid side converter 20 is further simplified below in terms of only magnitude values of measurement signals P and Q.

The real (P) and reactive power (Q) magnitudes flowing out of output terminals 44 may be given as:

$$P + j \cdot Q = V \cdot I^* \qquad (5)$$

The above equation (5) now can be solved by substituting value of I* from equation (4) for determining V, in terms of real (P) and reactive power (Q) magnitudes.

$$V = \sqrt{\frac{V_0^2}{2} + X \cdot Q + \frac{1}{2}\sqrt{V_0^4 + V_0^2 \cdot 4X \cdot Q - 4X^2 \cdot P^2}} \qquad (6)$$

Equation (6) is an exact equation and can be approximated as below:

$$V = V_0 + \frac{X \cdot Q}{V_0} \qquad (7)$$

As can be seen from above equation if V is measured then $V_0$ can be determined from it. It should be noted here that in the above equation all quantities V, $V_0$, and X may be single phase line to neutral quantities or positive sequence or three phase vector magnitude quantities. If single phase line to neutral quantities are used for V, $V_0$, and X then the real (P) and reactive power (Q) will be single phase quantities. On the other hand if positive sequence or three phase vector magnitude quantities are used for V, $V_0$, and X then P and Q will be three phase quantities.

It can be seen that if the open circuit voltage $V_0$ and reactance X which are grid values are considered constant at any particular time then raising Q will be accompanied by an increase in voltage V. In some embodiments this may result in the voltage reaching a maximum allowed value $V_{MAX}$ of the converter 20. Thus, $V_{MAX}$ can be given as:

$$V_{MAX} = V_0 + \frac{X \cdot Q_{MAX}}{V_0} \quad (8)$$

However, over the time, as the conditions on the grid change, in particular as the open circuit voltage $V_0$ changes, the amount of reactive power Q that will push the voltage to its limit will change. Therefore, an expression that will reflect this dependence, without a direct measurement of the open circuit voltage $V_0$ is provided herewith. The open circuit voltage $V_0$ can be inferred from P, Q, X, and the voltage at the interconnection point V from equation (7) above. This value can be substituted into equation (8) and solved for the value of Q that will push the voltage to the maximum allowable value. This value of Q is given approximately by:

$$Q_{MAX}(t) \approx Q(t) + \frac{(V_{MAX} - V(t)) \cdot V(t)}{X} \cdot \left(1 - \frac{X \cdot Q(t)}{V^2(t)}\right) \quad (9)$$

where $Q_{MAX}(t)$ is maximum reactive power Q at time t, Q(t) is reactive power Q at time t, $V_{MAX}$ is the maximum allowable voltage by the converter and V(t) is the voltage V at time t.

It should be noted that the reactance, X, is a key parameter. Generally X is constant. However, with changes in grid, it might change slightly with time. In accordance with an embodiment, X is determined by deliberately generating a small change in Q and V. For example, in the equation (7), assuming $V_0$ is constant, dV/dQ may be given as:

$$dV/dQ = X/V_0 \quad (10)$$

substituting value of $V_0$ in terms of V and solving for X gives:

$$X \approx \frac{V \cdot \frac{dV}{dQ}}{1 + \frac{Q}{V} \cdot \frac{dV}{dQ}} \approx \frac{V}{\frac{dQ}{dV} + \frac{Q}{V}} \quad (11)$$

where dV is small change in voltage V and dQ is small change in reactive power Q.

Figure 3:
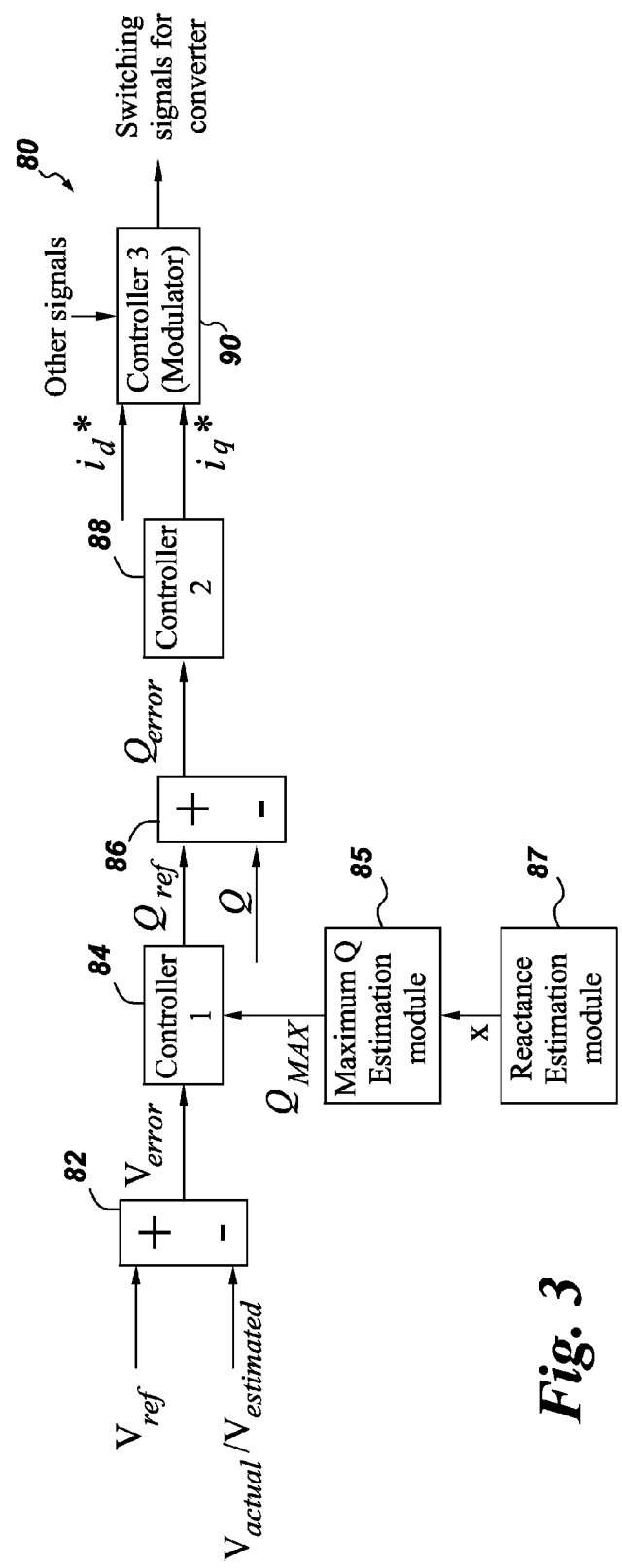
FIG. 3 is a block diagram representation of a voltage controller for use in the grid side controller of FIG. 2, in accordance with an embodiment of the present technique.

FIG. 3 shows a voltage controller 80 for use in grid side controller 18 of FIG. 2, in accordance with an embodiment of the present technique. Voltage controller receives input signals such as a reference voltage magnitude $V_{ref}$ and the measured $V_{actual}$ or estimated voltage magnitude $V_{estimated}$. The reference voltage magnitude $V_{ref}$ may be determined by a system operator based on system conditions. An error voltage $V_{error}$ between reference voltage magnitude $V_{pref}$ and the estimated voltage magnitude $V_{estimated}$ or $V_{actual}$ is determined by subtraction block 82. The error voltage $V_{error}$ is provided to a first controller 84 which further generates a reference reactive power magnitude $Q_{ref}$. The controller 84 also receives value of maximum limit $Q_{MAX}$ on reactive power $Q_{ref}$ as determined by equation (11) above from a maximum reactive power estimation module 85. A reactance estimation module 87 estimates value of X based on equation (11) above and provides it to the maximum reactive power estimation module 85. In one embodiment, the maximum reactive power estimation module 85 and reactance estimation module 87 may be provided outside of the voltage controller 80. The reference reactive power magnitude $Q_{ref}$ is then compared with the measured reactive power magnitude Q in subtraction block 86 and an reactive power error $Q_{error}$ generated by block 86 is provided to a second controller 88. Second controller 88 then generates a q-domain reference current signal $i_q^*$ which is used along with a d-domain reference current signal $i_d^*$ by a third controller 90 to generate switching signals for grid converter 20. It should be noted that third controller 90 may receive other input signals such as measured d and q-domain current signals $i_q$ and $i_d$ and voltage and/or power signals. Further, third controller 90 may also include a modulator for generating switching signals based on the reference and measured current and voltage signals. The d-domain reference current signal $i_d$ may be determined by a system operator or other controllers (not shown).

One of the advantages of the present technique is it allows predicting the amount of reactive power that can be transferred without exceeding the maximum voltage limit of the power converter in order to control the voltage at solar power system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A solar power conversion system comprising:
   a photovoltaic array having photovoltaic modules for generating direct current (DC) power;
   a power converter for converting the DC power to alternating current (AC) power;
   a transformer coupled between the power converter and a power grid for transmitting the AC power to the power grid, wherein the transformer is connected to the power grid at the point of common coupling (PCC) and to the power converter at output terminals;
   a reactance estimation module configured to estimate a short circuit reactance at PCC based on a small change in a measured voltage at output terminals with respect to a small change in a measured reactive power at the output terminals;
   a maximum reactive power estimation module to estimate a maximum reactive power based on the estimated reactance, the measured voltage at output terminals, and the measured reactive power at the output terminals; and
   a controller for generating switching command signals for the power converter based on the measured voltage at output terminals and the estimated maximum reactive power.

2. The system of claim 1 further comprising a DC to DC converter connected between the PV array and a DC link to maintain a constant DC voltage at the DC link.

3. The system of claim 2 comprising a DC to DC controller to control the operation of DC to DC converter.

4. The system of claim 1 further comprising filters connected between the power converter and the output terminal for removing harmonics from the system output power.

5. The system of claim 1, wherein the power converter provides reactive power to the transformer to compensate for the PCC voltage variation.

6. The system of claim 1, wherein the maximum reactive power estimation module estimates the maximum reactive power based on following equation:

$$Q_{MAX}(t) \approx Q(t) + \frac{(V_{MAX} - V(t)) \cdot V(t)}{X} \cdot \left(1 - \frac{X \cdot Q(t)}{V^2(t)}\right)$$

where $Q_{MAX}(t)$ is maximum reactive power at time t, Q(t) is measured reactive power at time t, $V_{MAX}$ is the maximum allowable voltage by the power converter at time t, V(t) is the measured voltage V at time t and X is the short circuit reactance.

7. The system of claim 6, wherein the reactance estimation module estimates the short circuit reactance based on following equation:

$$X \approx \frac{V \cdot \frac{dV}{dQ}}{1 + \frac{Q}{V} \cdot \frac{dV}{dQ}} \approx \frac{V}{\frac{dQ}{dV} + \frac{Q}{V}}$$

V is the measured voltage at output terminals, Q is the measured reactive power at output terminals, dV is small change in measured voltage V and dQ is small change in measured reactive power Q.

8. The system of claim 7, wherein V includes single phase line to neutral quantity or positive sequence quantity or three phase vector magnitude quantity.

9. The system of claim 1 further comprising a first controller to generate a reference reactive power magnitude for the power converter based on an error voltage.

10. The system of claim 9 comprising a first subtractor to generate the error voltage based on a reference voltage at output terminals and the measured voltage at output terminals.

11. The system of claim 9, wherein the reference voltage at output terminals is determined by a system operator based on system conditions.

12. The system of claim 11 comprising a second controller to generate a q-domain reference current signal based on a reactive power error between a reference reactive power and the measured reactive power.

13. A method to transmit solar power to a power grid, the method comprising:
providing a photovoltaic array having photovoltaic modules for generating direct current (DC) power;
providing a power converter for converting the DC power to alternating current (AC) power;
coupling a transformer between the power converter and the power grid for transmitting the AC power to the power grid, wherein the transformer is connected to the power grid at the point of common coupling (PCC) and to the power converter at output terminals;
estimating a short circuit reactance at PCC based on a small change in a measured voltage at output terminals with respect to a small change in a measured reactive power at the output terminals;
estimating a maximum reactive power based on the estimated reactance, the measured voltage at output terminals, and the measured reactive power at the output terminals; and
generating switching command signals for the power converter based on the measured voltage at output terminals and the estimated maximum reactive power.

14. The method of claim 13, further comprising connecting a DC to DC converter between the PV array and a DC link to maintain a constant DC voltage at the DC link.

15. The method of claim 13 comprising providing reactive power to the transformer from the power converter to compensate for the PCC voltage variation.

16. The method of claim 13, wherein the maximum reactive power is estimated based on following equation:

$$Q_{MAX}(t) \approx Q(t) + \frac{(V_{MAX} - V(t)) \cdot V(t)}{X} \cdot \left(1 - \frac{X \cdot Q(t)}{V^2(t)}\right)$$

where $Q_{MAX}(t)$ is maximum reactive power at time t, Q(t) is measured reactive power at time t, $V_{MAX}$ is the maximum allowable voltage by the power converter at time t, V(t) is the measured voltage V at time t and X is the short circuit reactance.

17. The method of claim 16, wherein the short circuit reactance is estimated based on following equation $$X \approx \frac{V \cdot \frac{dV}{dQ}}{1 + \frac{Q}{V} \cdot \frac{dV}{dQ}} \approx \frac{V}{\frac{dQ}{dV} + \frac{Q}{V}}$$

V is the measured voltage at output terminals, Q is the measured reactive power at output terminals, dV is small change in measured voltage V and dQ is small change in measured reactive power Q.

18. The method of claim 17, wherein V includes single phase line to neutral quantity or positive sequence quantity or three phase vector magnitude quantity.

19. The method of claim 13 further comprising generating a reference reactive power magnitude for the power converter based on an error voltage between a reference voltage at output terminals and the measured voltage at output terminals.

20. The method of claim 19 comprising generating a q-domain reference current signal based on a reactive power error between a reference reactive power and the measured reactive power.

* * * * *